Figure 2:
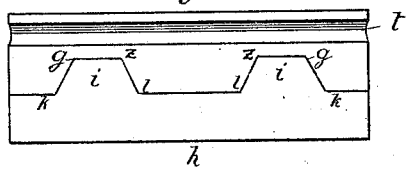

(No Model.)

H. L. ARNOLD.
METHOD OF AND DEVICE FOR CUTTING BARBS ON STRIPS OF METAL.

No. 306,313. Patented Oct. 7, 1884.

WITNESSES:
Wm A. Lowe
O. H. Morgan

INVENTOR
Horace L. Arnold
BY A. P. Thayer
ATTORNEY

N. PETERS. Photo-Lithographer, Washington, D. C.

UNITED STATES PATENT OFFICE.

HORACE LUCIEN ARNOLD, OF MIDDLETOWN, CONNECTICUT, ASSIGNOR TO THOS. W. HALL, OF BROOKLYN, NEW YORK.

METHOD OF AND DEVICE FOR CUTTING BARBS ON STRIPS OF METAL.

SPECIFICATION forming part of Letters Patent No. 306,313, dated October 7, 1884.

Application filed December 5, 1882. (No model.)

*To all whom it may concern:*

Be it known that I, HORACE L. ARNOLD, a citizen of the United States, residing at Middletown, in the county of Middlesex and State of Connecticut, have invented new and useful Improvements in Device for and Method of Cutting Barbs on Metallic Fencing, of which the following is a specification.

My invention relates to dies employed for separating and pointing or barbing the blank strips for barbed fencing consisting of two parallel cores or ribs and a connecting-web, for which a patent was granted November 30, 1880, No. 234,936, the same being a double blank strip out of which two separate barbed rods or strips are to be produced by the separating and pointing operations.

The object of the invention is to contrive a method of shearing or slitting the strips apart, cutting away the waste pieces, and simultaneously forming two barbed rods out of one blank strip in a manner enabling the work to be accomplished with less labor and wear of dies and more rapidly than the same has been heretofore accomplished by punching-dies.

The common method of cutting two barbed strips from a single blank strip consists in punching diagonal slits partly across the strip alternately converse to each other, and opening, or nearly opening, into each other, and has been worked successfully for making tack-strips of soft thin iron; but for making barbed fencing of strips of steel and of thicker dimensions the wear of the punches and dies and the great power required have not been satisfactory; hence it is now proposed to provide a way in which these strips may be separated and the barbs simultaneously formed on them by shearing or slitting the metal instead of punching it, which is a much easier operation than punching, as is well understood, and enables the machine to run much faster without requiring as much power or causing as much wear as the punching process; but the form of the barbs, their distance apart, and the waste portions of the blank strip to be cut away between the barbs preclude the possibility of doing the work by a simple process of slitting along the blank strip between the two rods produced therefrom by a single cut. The problem is to cut along each rod on a line with the bases of the barbs and around the sides and points of the barbs of both rods, and to form the barbs of both rods in a breadth of the strip equal to the length of the barbs, but making the barbs much wider apart than the width of the barbs, so that, besides cutting the barbs of one rod from between the barbs of the other rod, there are also waste pieces of metal to be cut from between all the barbs. To do this by punching only requires the punching out of the waste pieces, so that the slits or notches open, or nearly open, into each other, as before stated; but to accomplish it by a shear-cutting operation demands an arrangement of dies and method of operation not heretofore made known. It will be understood, however, that to punch out the oblique form of the slits, which have to be made to produce the bevel-pointed barbs, requires the punches to be made with two acute angles that wear off rapidly and frequently crack off, which, together with the greater power required to work the punches, makes an easier method very desirable.

The arrangement of dies consists of one die having two oblique-sided ribs on one side, and another die having two corresponding grooves on one side, the distance between the two ribs and grooves being equal to the distance the barbs are to be apart on the completed rods, and the width of the ribs and grooves being equal to the width of one barb and one waste-piece to be cut away between the barbs in the process of separating and barbing the rods. The aggregate width of the die, ribs, and grooves and the space between them—that is to say, the distance from outside to outside of the ribs and grooves—is double the distance between the barbs. This measures the width of the dies proper; but to avoid sharp and weak angles at the edges of the die having the grooves the dies have marginal extensions of suitable breadth for the purpose beyond the outer edges of the grooves.

The method of operation with these dies is as follows: The blank strip is first inserted between the dies to the center—that is, to the middle of the space between the two die ribs and grooves, by which said strip is slitted in the first operation of the dies along one rod the length of one waste piece to be cut away; thence diagonally across to the other rod along one side of a barb; thence along the other rod the length of another waste piece to be cut away, and thence diagonally back to the first rod along the side of another barb. The blank strip is then shifted along a distance equal to the distance of the barbs apart on the completed rods, so that the length of strip thus cut is presented between the other half of the dies, and a new length is presented under the first half. While the new length is being cut between the first half of the dies, as before, the length already cut is being again cut between the second half of the dies, as follows: Supposing the cut to begin at the end of the blank strip, as before, the line is diagonally across from the beginning of the first slit parallel with the first diagonal line of the first cut to the other rod; thence along said rod the length of one waste piece, cutting out said waste piece; thence crossing the first cut at the point of one of the barbs, and crossing diagonally back to the first rod and parallel with the second diagonal line of the first cut, and thence along the first rod the length of another waste piece and cutting out the same. The blank is thus practically slitted along two lines by one pair of slitting-dies, which cut one line across the other line, and thus cut around and cut out the waste pieces from between the barbs, at the same time forming said barbs and producing two barbed rods from one strip by strictly slitting action, as hereinafter fully described, reference being made to the accompanying drawings, in which—

Figure 1:
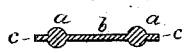
Figure 3:
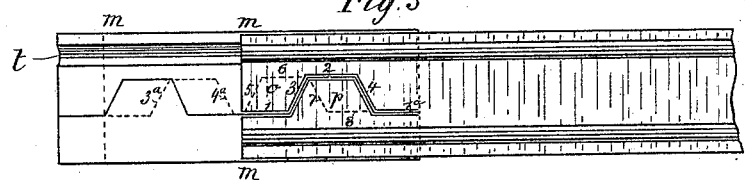
Figure 4:
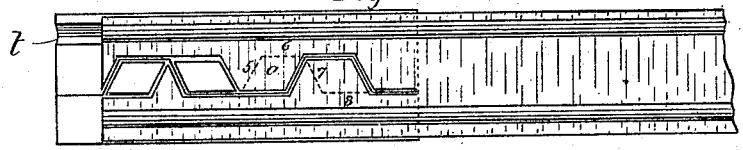
Figure 5:
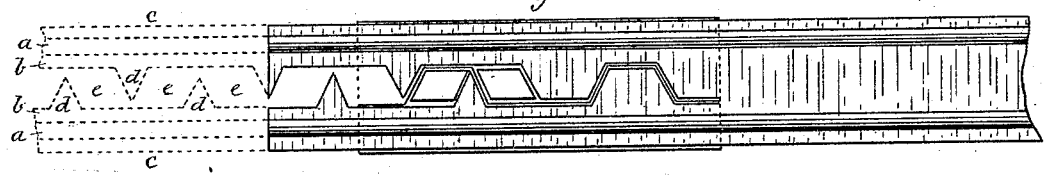
Figure 6:
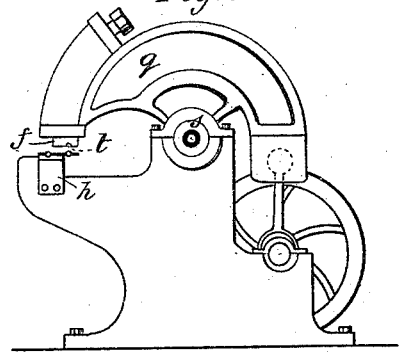
Figure 7:

Figure 1 is a transverse section of the blank strip to be cut apart and barbed. Fig. 2 is a top view of the bed-die and a diagram of the face of the movable die. Fig. 3 is a plan view of the lower die and a diagram of the upper die, together with a plan view of a portion of the blank strip, showing the position of the strip and the slit made by the first portion of the dies, with dotted lines indicating the position of the blank and the slit of the second portion of the dies. Fig. 4 is a similar view of the dies and the blank strip, the latter being shifted to the second position. Fig. 5 is a similar view of the dies and the blank strip, the latter being shifted to its position at the third operation of the dies, and being represented in extension of the finished rods by dotted lines. Fig. 6 is a side elevation of a machine that may be employed for working the dies, and Fig. 7 is a side elevation of the upper die, showing a bevel form of the face which I propose to make for the purpose of shear-cutting the blank.

The blank strip to be cut consists of the two parallel cores or rods $a$ and their connecting-web $b$, together with the outside narrow fins, $c$. The barbed rods or strips to be produced out of the said blank strip are represented in the dotted lines, Fig. 5, where $a$ represents the cores or rods; $b$, portions of the web of $b$, Fig. 1, not cut away; $c$, the outside pins, and $d$ the points or barbs.

Cutting away the waste portions of the web $b$ from the spaces $e$ by punching them out, as heretofore practiced, is very hard and damaging service for the punches and dies, besides being slow and requiring great power, as before stated.

It is well understood that a slitting or shearing action along one line or side is simpler and less wearing and requires less power than to punch out all sides or all around a space at the same time, and it is for this method of operation that I have constructed the dies which I now propose to substitute for the punches heretofore used.

To make barbs any predetermined distance—say one inch—apart on each rod or strip, and at the same time to form the barbs or points of one rod or core midway between those on the other rod or core, I make a bed-die, $f$, with two vertical grooves, $g$, in its side, and a movable die, $h$, with two projecting ribs, $i$, on its side corresponding to and for working in the grooves, said ribs and grooves having bevel sides to produce the required taper of the barbs and being located apart the same distance the barbs are to be, but being as much wider than the width of the barbs to be formed as the width of one of the spaces $e$ to be cut out, the distance from $k$ to $k$ being double the distance of the barbs from center to center. The depth of the said grooves and ribs is the same or may be a little greater than the length of the barbs to be formed. The blank strip being fed in between the dies to the point $m$, Fig. 2, at the first operation the said strip will be slitted along the base lines 1, 2, and $1^a$, and the bevel side lines 3 and 4, by the first rib and groove. At the next movement, the strip being shifted a distance equal to the distance between the barbs, the bevel lines 3 and 4 will rest at $3^a$ and $4^a$, and the waste pieces $o$ $p$ will be cut away along the lines 5, 6, 7, and 8 by the second rib and groove, while the first rib and groove will again slit the blank along lines 1, 2, $1^a$, 3, and 4. Thus it will be seen that the work progresses by first slitting the blank with one portion of the dies along one line a length equal to one feed movement of the strip, and then similarly slitting said blank along another line and across the first line by another portion of the dies, the respective lines separating the two rods or strips and being the different sides of the spaces cut away in forming the barbs.

I call the device "shearing-dies," because they cut along only one line in the manner of shears, and I propose to bevel the face of the upper die, $h$, as represented in Fig. 7, to graduate the cut from the center each way and effect a shear-cutting action.

I prefer to mount the movable die on an arm or jaw, $q$, arranged to work on a pivot, $s$, by means of power applied to the end opposite to the one the die is attached to; but said die may of course be mounted on a sliding punch-stock, if preferred.

The die $f$ has a groove, $t$, along its upper face, and die $h$ has a similar groove, $t$, along its face for the ribs of the blank.

Suitable feed rolls and guides will be employed for feeding the blank strip to the dies, and a stripper will be employed to lift the rod or strip that is pressed down in grooves $g$ by the die $h$ up out of them, to allow it to feed along.

An important advantage of this method of making barbed fencing from double blank strips by shearing off the waste pieces as compared with punching them out consists of the free escape it affords the waste pieces cut off, which, it will be seen, are released the instant they are cut from any retaining force, and are thrust or fall away in advance of the cutters without any expenditure of power or wear of parts; whereas in the punching process the waste pieces bind hard against the walls of the female die, producing friction and wear and heat, and requiring power to force them through. This cannot be remedied by making the die of increasing diameter from the face downward without too much waste of dies, because such dies would be too large after once or twice grinding them to sharpen the edges. The diameter must be uniform for a sufficient depth to allow of grinding them off a considerable length before going to waste, in order to be practically useful.

It is true that pieces cut out of one edge of a strip, as in Allis's Patent No. 232,870, are so discharged; but it is the advantage of being able to so discharge such pieces from between the rods of a double strip that is here claimed, and is effected only by my method.

The essential feature of the dies is a rib and groove as wide as a barb, and one waste-piece arranged each side of a space as wide as the barbs are to be apart on the finished rods, and the method of operation consists of feeding the blank strip so as to cause each length fed to be twice acted on by the dies, the first action being by the first half of the dies and the second action by the second half. By this arrangement of the ribs and grooves of the width described, (the breadth of the barb and one waste-piece,) with the wider space (the width of the barbs apart on the single rods) between them, and by feeding the strip half the width of the dies at each movement, the second rib and groove overlap the cut of the first rib and groove, and thus cut the waste-pieces from the projections formed by the first rib and groove, and complete the barbs. If two or more ribs and grooves be arranged each side of the middle space and placed the same distance apart as their width, and the strips are alike fed half the width of the dies at each movement, the capacity of the dies will be correspondingly increased, as in that case the strips will be cut apart and the barbs formed on a greater length of the blank strip at once, the feed-movements being correspondingly increased.

I claim.

1. The method of separating a double blank strip and forming barbs on the separated rods, consisting of first shearing the strips apart and forming two rods, each having projections containing the material for one barb and one waste piece to be cut away between the barbs, alternating with notches of equal width, and, second, shearing away the waste pieces from the said projections, substantially as described.

2. The method of separating the double-blank strip herein described into two rods or strips and forming barbs thereon by first shearing the said blank along the lines 1 2 3 4 by means of dies, and next shearing the same along the lines 5, 6, 7, and 8 by said dies.

3. The combination of a pair of dies, $f$ and $h$, having grooves $g$ and ribs $i$ in their sides, respectively, and located the distance apart equal to the required distance of the barbs to be formed from each other, and being as wide as one barb, and one space, $e$, to be cut away between the barbs of the respective ribs or rods of the blank, substantially as described.

HORACE LUCIEN ARNOLD.

Witnesses:
W. J. MORGAN,
S. H. MORGAN.